(12) United States Patent
Hong et al.

(10) Patent No.: US 6,353,587 B1
(45) Date of Patent: Mar. 5, 2002

(54) OPTICAL PICKUP

(75) Inventors: Young Chi Hong; Young Joo Kim; Beom Seok Lee, all of Kyungki-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 09/219,991

(22) Filed: Dec. 23, 1998

(30) Foreign Application Priority Data

Jul. 29, 1998 (KR) ............................................ 98-30493

(51) Int. Cl.$^7$ ................................................. G11B 7/00
(52) U.S. Cl. ................................ 369/112.15; 365/112.1
(58) Field of Search ............................. 369/44.37, 112, 369/112.1, 112.15

(56) References Cited

U.S. PATENT DOCUMENTS

| | | | | |
|---|---|---|---|---|
| 5,684,779 A | * | 11/1997 | Ohuchida et al. | 369/44.37 X |
| 5,696,747 A | * | 12/1997 | Bartholomeusz | 369/44.37 X |
| 5,696,750 A | | 12/1997 | Katayama | 369/112 |
| 5,875,167 A | * | 2/1999 | Katayama | 369/44.37 X |
| 6,084,845 A | * | 2/1999 | Mizuno | 369/44.37 X |
| 5,999,509 A | * | 12/1999 | Sugiura et al. | 369/44.37 X |
| 6,043,935 A | * | 3/2000 | Lee | 369/44.37 X |
| 6,067,283 A | * | 5/2000 | Muramatsu | 369/44.37 X |

\* cited by examiner

Primary Examiner—Aristotelis M. Psitos
(74) Attorney, Agent, or Firm—Ladas & Parry (57) ABSTRACT

A first light source of an optical pickup emits a first laser beam having a first predetermined wavelength. A second light source emits a second laser beam that substantially perpendicularly crosses the first laser beam and has a second predetermined wavelength different from the first predetermined wavelength. A holographic beam splitter is slopingly disposed where the laser beams cross. The holographic beam splitter has a hologram diffractive surface on one surface and a coating layer on another surface for being penetrated by and reflecting the laser beams at a first predetermined ratio. A flat beam splitter is arranged on a first path of the laser beams from the holographic beam splitter to be penetrated by and reflect the laser beams at a second predetermined ratio. A collimator lens is arranged on a second path of the laser beams from the flat beam splitter to shape the laser beams. An objective lens focuses the shaped laser beams at least upon an optical disc. A photodiode reads out recorded and error information from the laser beams when reflected from the optical disc.

6 Claims, 11 Drawing Sheets

OPTICAL PICKUP

BACKGROUND OF THE INVENTION

1. Field of the Invention

The present invention relates to an optical pickup and more particularly, to an optical pickup which can play back a compact disc and a digital video disc through two light sources.

2. Description of the Prior Art

Generally, an optical disc is widely used these days because it can record and reproduce information relatively at a high density when compared to a long play record (LP) or a magnetic recording tape and can be kept semi-permanently.

A compact disc (CD) is most widely spread and used as an optical disc. However, since the compact disc has a limited recording capacity, it cannot be reliably used for a movie, music, a game, or other multimedia which have a playing time exceeding, for example, 90 minutes. For this reason, it is necessary to prepare two or more discs and continuously play back them.

To resolve this problem, a digital video disc (DVD) is recently developed as a next generation optical disc. A DVD has a memory capacity which is 25 times that of a CD and can read ten million bit data per second. This is because the DVD has pits and tracks which correspond to halves of those of the CD. In other words, because a pit and a track of the DVD are about 0.4 feet and 0.8 micron, respectively, a high density recording is possible. Accordingly, due to this high capacity and operational capability, the DVD can be easily used in various fields such as a movie, music, a game or other multimedia.

On the other hand, while an optical pickup can be provided for exclusively playing back the DVD, it is preferred that both a CD and a DVD be played back by the same player in view of economics. Accordingly, a demand for an optical pickup which can play back a CD and a DVD, is gradually increasing among customers.

Figure 1:
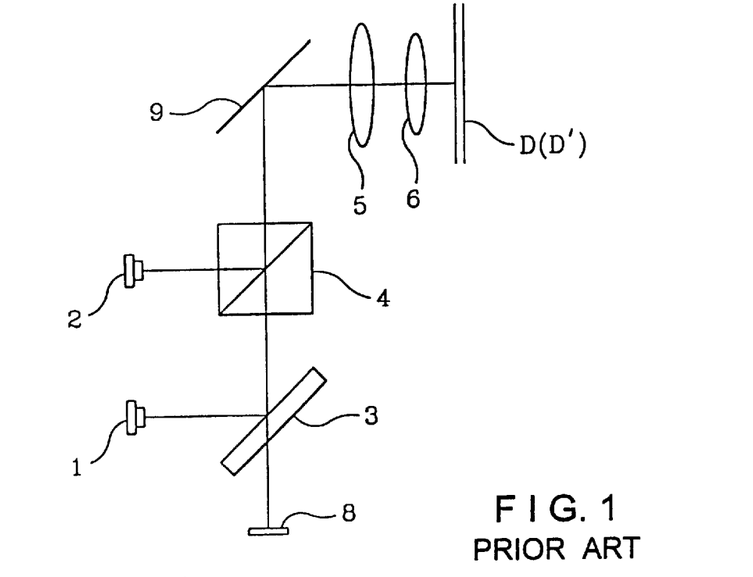
FIG. 1 is a schematic view of an optical system illustrating an optical pickup of the prior art.

Referring to FIG. 1, there is shown a schematic view of an optical pickup of the prior art, which uses two light sources in order to play back both a CD and a DVD.

The optical pickup of the prior art includes a first light source 1 for recording and reproducing information onto and from a digital video disc D. This first light source 1 may be a laser diode which emits a beam of 650 nm wavelength.

The optical pickup also includes a second light source 2 for recording and reproducing information onto and from a compact disc D'. This second light source 2 may be a laser diode which emits a beam of 780 nm wavelength. The second light source 2 is positioned such that it is parallel to the first light source 1.

A flat beam splitter 3 is arranged on a path of the beam emitted from the first light source 1, and a cubic beam splitter 4 is arranged on a path of the beam emitted from the second light source 2.

The optical pickup includes a reflecting mirror 9 for directing beams which are emitted from the first and second light sources 1 and 2 and then reflected from the flat beam splitter 3 and the cubic beam splitter 4 toward the digital video disc D and the compact disc D', and a collimator lens 5 for shaping the beams reflected from the reflecting mirror 9.

The optical pickup further includes an objective lens 6 for spotting the beams shaped by the collimator lens 5 onto the digital video disc D and the compact disc D', and a photodiode 8 for detecting recorded information and an error from the beams reflected from the digital video disc D and the compact disc D'.

The optical pickup of the prior art, constructed as mentioned above, has an advantage in that stable recording and reproducing operations are ensured. That is, an aberration is generated only in an small amount during the travel of the beams emitted from the first and second light sources 1 and 2 and reflected by the flat beam splitter 3 and the cubic beam splitter 4 to be spotted onto the optical discs.

Figure 2:
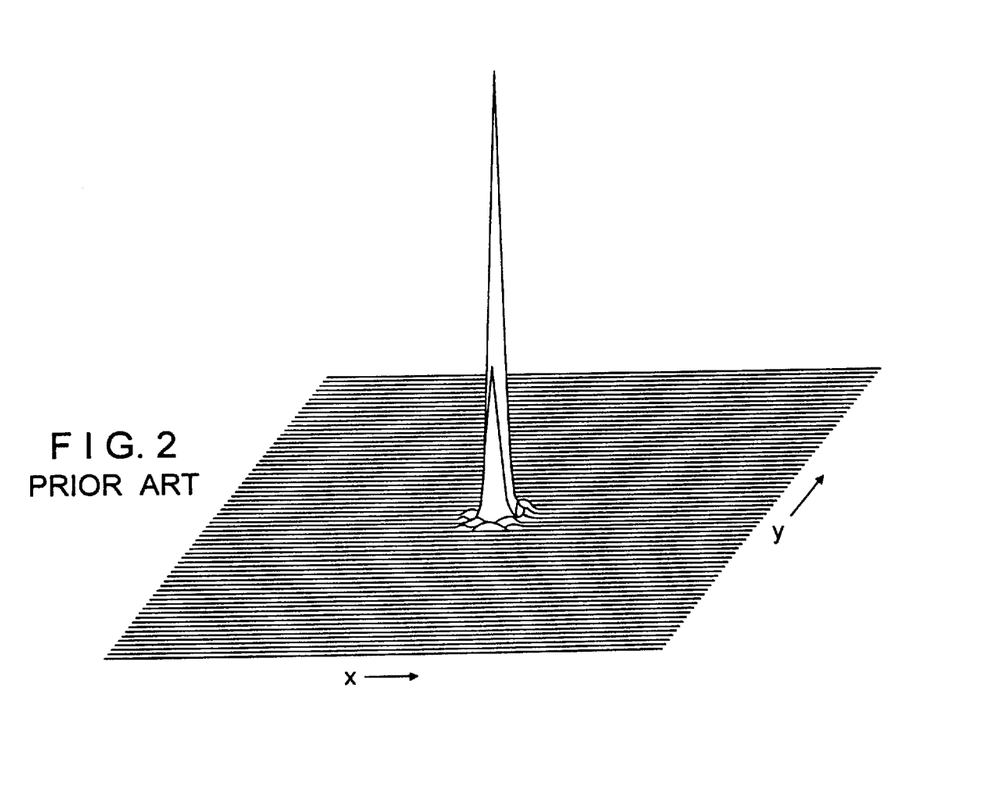
FIG. 2 is a spot diagram of a beam generated through the optical pickup of the prior art.

In other words, a very fine and stable spot can be obtained, as shown in a spot diagram of FIG. 2.

However, since the costly cubic beam splitter 4 must be used in order to obtain such a stable spot, expenses of the optical pickup are increased.

Also, since the first and second light sources 1 and 2 are disposed in side-by-side relationships with the flat beam splitter 3 and the cubic beam splitter 4, respectively, a relatively wide installation space is needed and it is difficult to manufacture a compact optical system.

Figure 3:
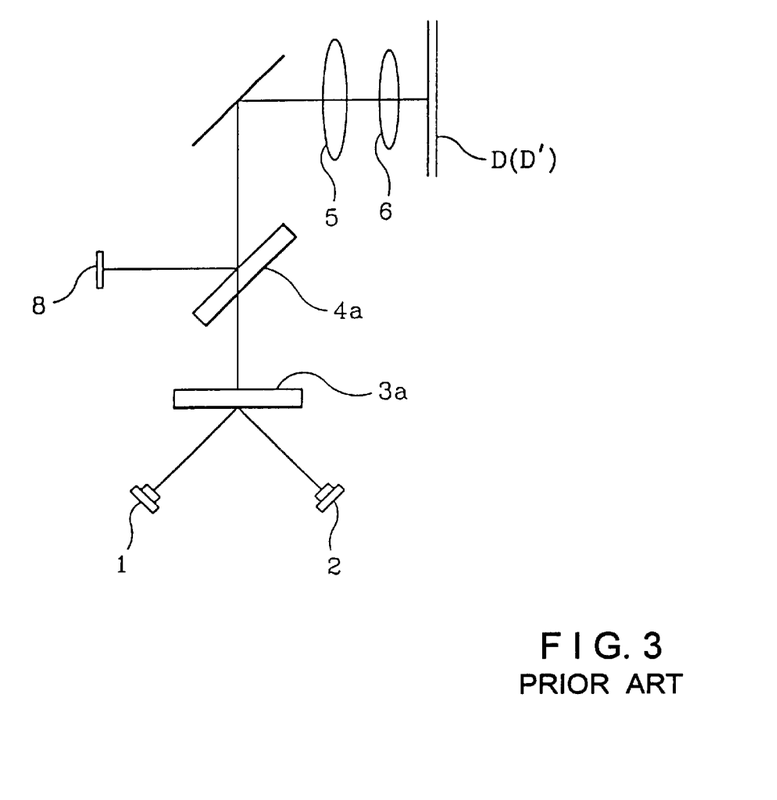
FIG. 3 is a schematic view of another optical system illustrating another optical pickup of the prior art.

Referring to FIG. 3, there is shown a schematic view of another optical pickup of the prior art, which uses two light sources.

The optical pickup uses an anisometrical hologram beam splitter 3a. In this respect, first and second light sources 1 and 2 are slopingly mounted such that they define predetermined angles to a plane of the hologram beam splitter 3a.

On a path of beams which are emitted from the first and second light sources 1 and 2 while extending through the hologram beam splitter 3a, there are sequentially disposed a flat beam splitter 4a, a collimator lens 5 for shaping the beams, and an objective lens 6 for spotting the beams onto optical discs. The flat beam splitter 4a is slopingly mounted.

The optical pickup includes a photodiode 8 for detecting recorded information and an error from the beams reflected by optical discs. The photodiode 8 is disposed such that it is opposed to the flat beam splitter 4a while sandwiching the hologram beam splitter 3a therebetween.

While the optical pickup of the prior art, constructed as mentioned above, has an advantage in that without using a cubic beam splitter, expenses are reduced, it still suffers from defects in that due to wavelength variations of the beams emitted from the first and second light sources 1 and 2, a flickering of an optical axis is caused in an entire optical system.

That is, in case of a conventional laser diode, a wavelength variation through $\mp 20$ nm is caused due to a variation in a surrounding temperature of the optical system.

Figure 4:
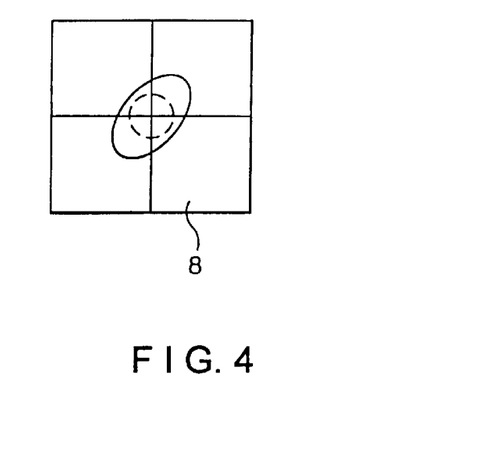
FIGS. 4 and 5 are plan views illustrating a state in which a light spotted onto a photodiode is detected without the tilt of optical axis.

Accordingly, a method for correcting a focusing error relying upon a change in a position of an optical disc by using a 4-divided photodiode, includes detecting a change of quantity of light spotted onto the 4-divided photodiode as shown in FIG. 4 and focusing the optical pickup by using the detected results to thereby correct the error.

Figure 5:
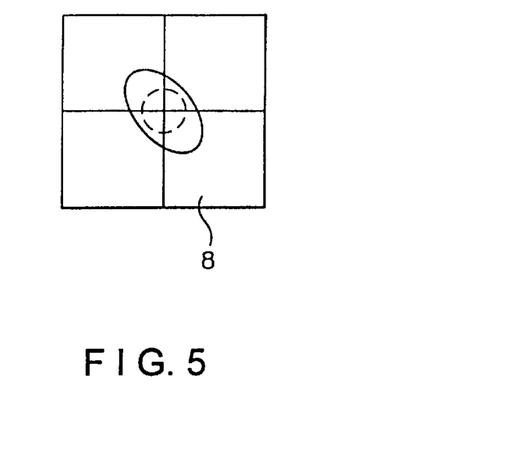

However, in case that the anisometrical hologram is used as described above, since angles of a wave front and a wave tail are changed so that a tilt of a light axis exceeding 0.2° is caused at an exit side of the light, a configuration of a light spotted onto the optical disc is deteriorated. At the same time, when a position of a light spotted onto the photodiode is changed relying upon a wavelength, in case that the light is focused onto the photodiode as shown in FIG. 5, the optical system cannot properly calculate a focusing error of the optical disc in terms of quantity of light which is spotted onto a portion of the 4-divided photodiode.

Figure 6A:
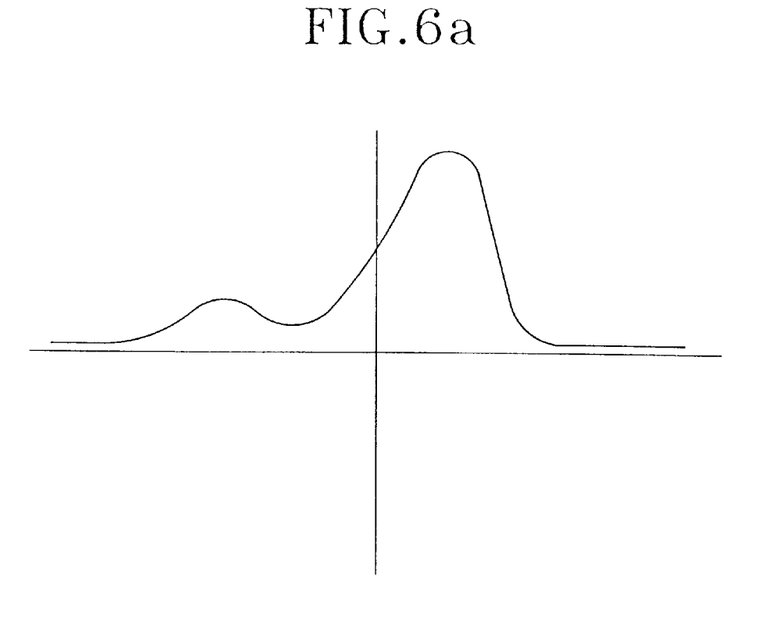
FIGS. 6a and 6b are graphs each showing an S-curve when a light spotted onto a photodiode is detected in case of an optical axis is tilted due to the variation of wavelength of light source.
Figure 6B:
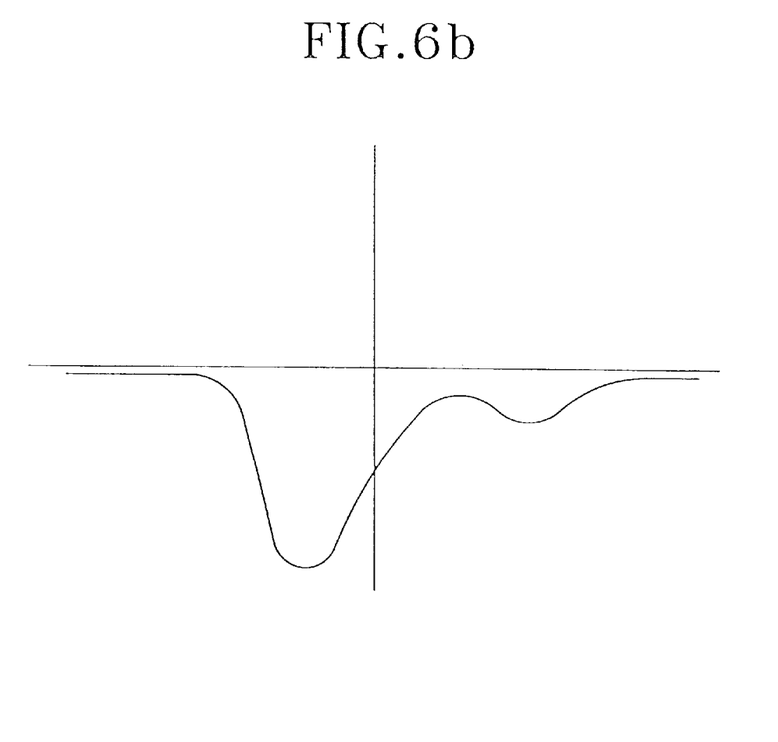
Figure 7:
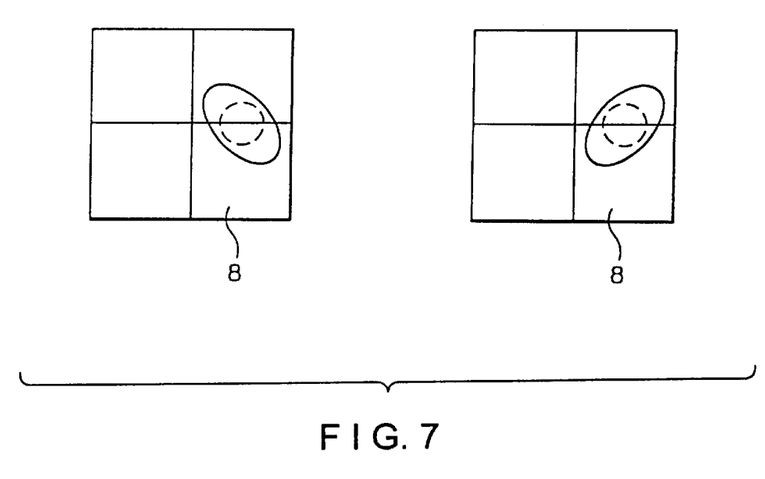
FIG. 7 is a plan view illustrating a state in which the light spotted onto the photodiode is detected when the tilt of optical axis is caused.

Namely, as shown in FIGS. 6a and 6b each of which shows an S-curve illustrating a light quantity difference in accordance with a distance between the objective lens 6 and the optical disc, a variation in quantity of the light which is spotted onto the photodiode is made non-uniform, and according to this, a quantity distribution of the light which is spotted onto the photodiode is, as shown in FIG. 7, lopsided. Hence, it is impossible to calculate through the photodiode, whereby a focusing error is caused.

Figure 8:
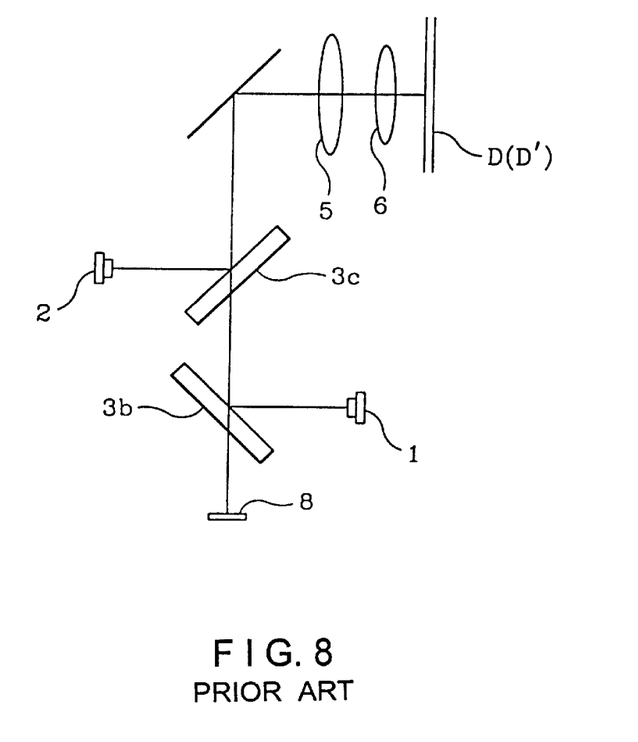
FIG. 8 is a schematic view of still another optical system illustrating still another optical pickup.

Referring to FIG. 8, there is shown a schematic view of still another optical pickup of the prior art.

The optical pickup shown in FIG. 8 uses two flat beam splitters 3b and 3c.

That is, the flat beam splitters 3b and 3c are matched with first and second light sources 1 and 2, respectively.

However, in the optical pickup of the prior art, since it is complicated to define angles between axes and the first and second light sources 1 and 2, it is difficult to construct an optical system, and an aberration property is deteriorated.

Figure 9:
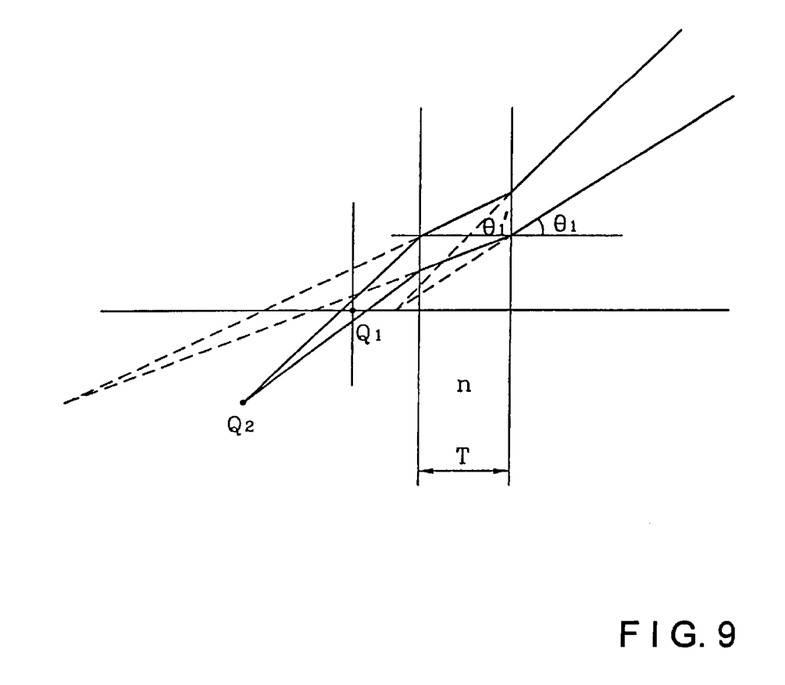
FIGS. 9 and 10 are a conceptual view and a spot diagram, respectively, illustrating an astigmatism generated on a beam which passes through a flat beam splitter of the prior art.

To be more detailed, as shown in FIGS. 8 and 9, an aberration is caused while beams are spotted onto optical discs by an objective lens 6 after being emitted from first and second light sources 1 and 2 and passing through the flat beam splitters 3b and 3c which are slopingly mounted at a predetermined angle.

In other words, on the basis that the flat beam splitters 3b and 3c are slopingly mounted, when assuming that $\theta_1$, $\theta_2$ are incident angles of the beams emitted from the first and second light sources 1 and 2, n is an index of refraction of the flat beam splitters 3b and 3c, and T is a thickness, an astigmatism can be expressed as given in an equation 1 described in below:

$$\text{Equation 1:} \quad \overline{Q_1 Q_2} = \frac{1}{n\cos\theta'_1}\left[1 - \frac{\cos^2\theta_1}{\cos^2\theta'_1}\right]T$$

When a spot focused onto the optical disc is influenced by the astigmatism thus generated, it is to be readily understood from FIG. 8 that a very unstable and large spot is formed.

Accordingly, since beams emitted from the first and second light sources 1 and 2 and beams reflected from the optical discs must pass through the flat beam splitters 3b and 3c, respectively, it is difficult to construct an optical system in consideration of these facts.

SUMMARY OF THE INVENTION

Accordingly, the present invention has been made in an effort to solve the problems occurring in the prior art, and an object of the present invention is to provide an optical pickup which offsets an astigmatism generated in a flat beam splitter by light wave modulation of a hologram diffractive surface to render an optical system to be easily constructed, and does not use a costly cubic beam splitter, in order to cut down expenses.

In order to achieve the above object, according to one aspect of the present invention, there is provided an optical pickup comprising: a first light source for emitting a laser beam having a first predetermined wavelength; a second light source disposed on an optical axis such that it is substantially perpendicular to the first light source, for emitting a laser beam having a second predetermined wavelength which is different from the first predetermined wavelength; a holographic beam splitter slopingly disposed at a point where laser beams emitted from the first and second light sources are crossed with each other, the holographic beam splitter having one surface on which a hologram diffractive surface is formed and the other surface on which a coating layer for being penetrated by and reflecting the laser beams at a first predetermined ratio is formed; a flat beam splitter arranged on a first path of the laser beams of the first and second light sources which are passed through the holographic beam splitter, for being penetrated by and reflecting the laser beams at a second predetermined ratio; a collimator lens arranged on a second path of the laser beams of the first and second light sources which are passed through the flat beam splitter, for shaping the laser beams emitted from the first and second light sources; an objective lens for focusing the laser beams shaped by the collimator lens upon an optical disc; and a photodiode arranged below the flat beam splitter, for reading out recorded information and an error from the laser beams which are focused and reflected upon and from the optical disc.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Figure 11:
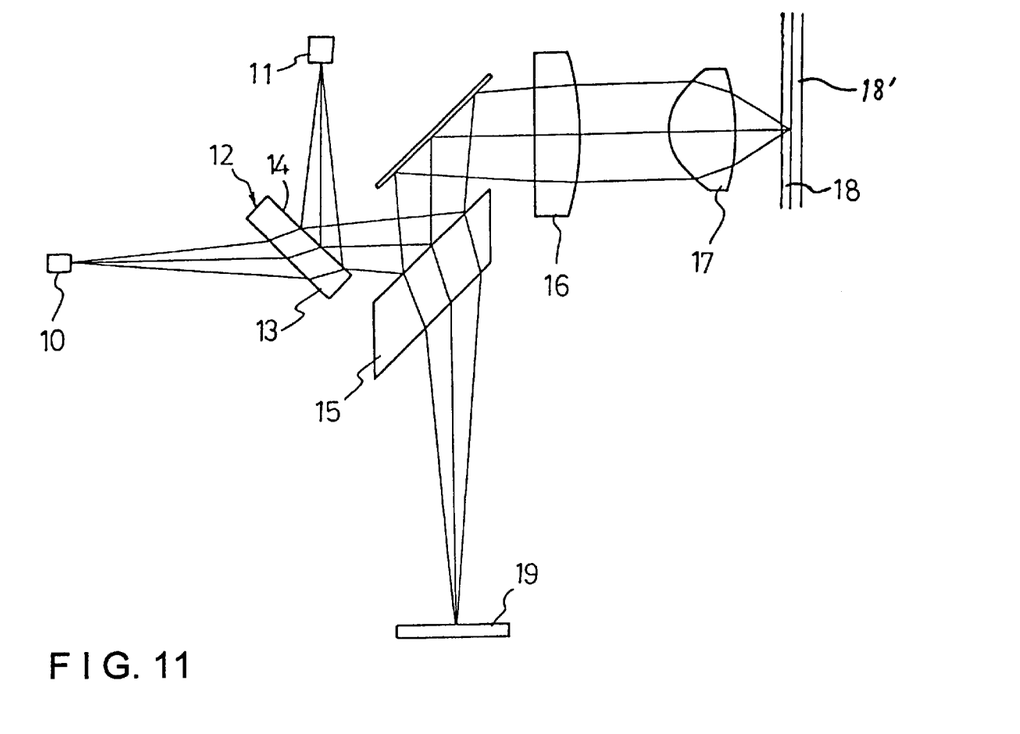
FIG. 11 is a schematic view of an optical system illustrating an optical pickup in accordance with an embodiment of the present invention.

As shown in FIG. 11, an optical pickup according to the present invention includes first and second light sources 10 and 11 which are disposed perpendicularly to each other.

The first and second light sources 10 and 11 emit beams of different wavelengths. The first light source 10 uses a laser diode of 650 nm wavelength to allow a digital video disc 18 to be recorded and played back, and the second light source 11 uses another laser diode of 780 nm wavelength to allow a compact disc 18' to be recorded and played back.

At a point where the laser beams emitted from the first and second light sources 10 and 11 are crossed with each other, there is located a holographic beam splitter 12, as having an essential feature of the present invention, such that it is sloped at a predetermined angle.

The holographic beam splitter 12 has one surface which is on a path of the beam emitted from the first light source 10 and on which a hologram diffractive surface 13 is formed, and the other surface which is on a path of the beam emitted from the second light source 11 and on which a coating layer 14 for being penetrated by and reflecting the beam at a predetermined ratio is formed.

At this time, it is to be readily understood that the positions of the first and second light sources 10 and 11 can be changed.

A flat beam splitter 15 is positioned on paths of the beams which are emitted after passing through from the holographic beam splitter 12. The flat beam splitter 15 is penetrated by and reflects the beams at a predetermined ratio. Then, a collimator lens 16 for shaping the beams which are reflected from the flat beam splitter 15 and an objective lens 17 for spotting the shaped beams upon the digital video disc 18 and the compact disc 18' are sequentially arranged.

Below the flat beam splitter 15, a photodiode 19 for reading out recorded information and an error signal from the laser beams which are reflected from the digital video disc 18 and the compact disc 18' and spotted thereupon, is positioned.

Figure 10:
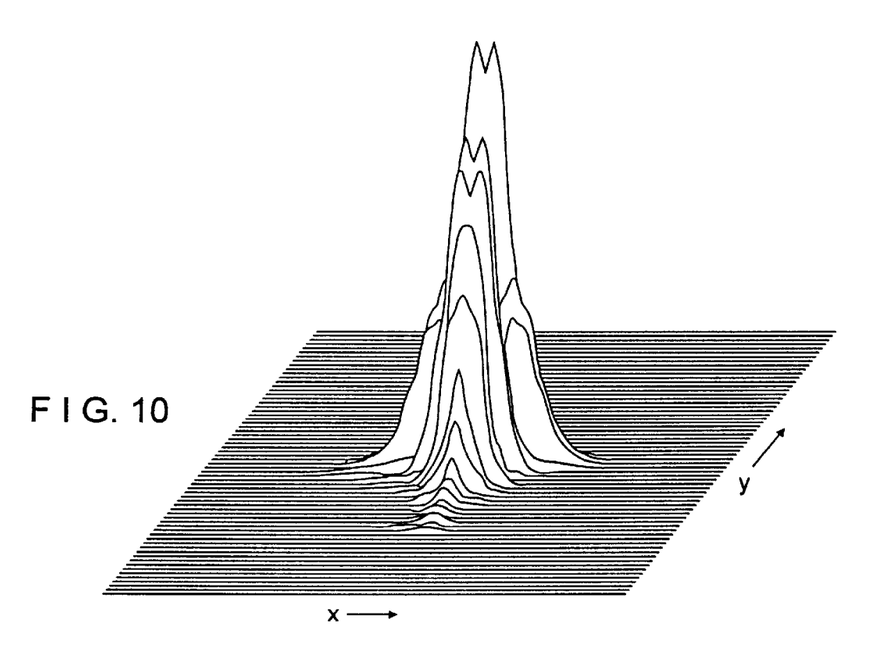
Figure 12:
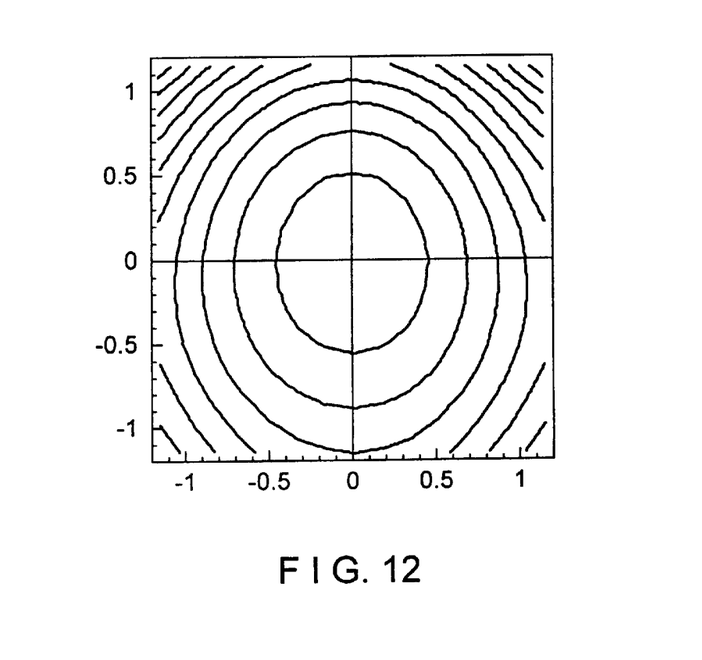
FIG. 12 is a side view conceptually illustrating a surface of a holographic beam splitter of the optical pickup according to the present invention.
Figure 13:
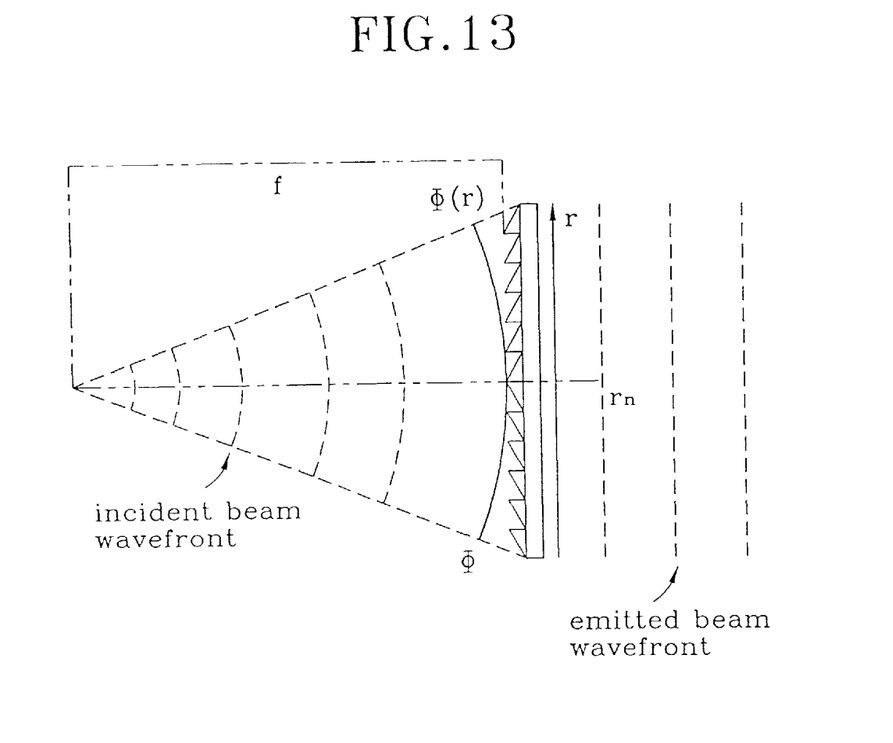
FIG. 13 is a conceptual view illustrating a beam which passes through a hologram diffractive surface.

The hologram diffractive surface 13 formed on one surface of the holographic beam splitter 12, which is an essential feature of the present invention as described above, functions to compensate for an astigmatism (FIG. 10) generated when the beam emitted from the first light source 10 passes through a flat glass. As shown in FIG. 12, the hologram diffractive surface 13 has a configuration which is anisometrically formed from a center as described below.

When first explaining a general characteristic of the hologram diffractive surface 13, since the holographic beam splitter 12 is sloped at the predetermined angle, when the beam is passed through the holographic beam splitter 12, a light wave is changed to a uniformly shaped beam.

The light wave formed on the hologram diffractive surface 13 can be expressed in spherical coordinates from an equation 2 as described below:

$$\text{Equation 2:} \quad \Phi(r) = \frac{2\pi}{\lambda_0}[A_1 r^2 + A_2 r^4 + A_3 r^6 + \cdots]$$

where A1, A2, A3, ..., An: Arbitrary coefficients deciding wavefront on HOE.

Also, the hologram diffractive surface 13 has a predetermined height ($h_{th}$). When assuming that n is an index of refraction of the holographic beam splitter 12 and $\lambda$ is a wavelength of a light source, the height of the hologram diffractive surface 13 can be obtained through an equation 3 as described below:

$$\text{Equation 3:} \quad h_{th} = \frac{\lambda_0}{(n-1)}$$

where n: Index of refraction of the hologram substrate

On the other hand, the holographic beam splitter 12 actually applied to the present invention is, as shown in FIG. 11, sloped at the predetermined angle, and has the configuration shown in FIG. 12. In this case, a light wave modulation and a wave surface thereof on the hologram diffractive surface 13 for compensating an astigmatism and a coma generated due to deformation of the light wave when the beam passes through the flat beam splitter, 15 can be expressed as given in an following equation 5; and the height of the hologram diffractive surface 13 can be expressed as given in an following equation 4:

$$\text{Equation 4:} \quad h_{th} = \frac{\lambda_0}{(n-1)\cos\theta}$$

$$\text{Equation 5:} \quad \psi(x, y) = \frac{2\pi}{\lambda}\left(\sum_{n,m} a_{n,m} x^n, y^m\right)$$

Figure 15:
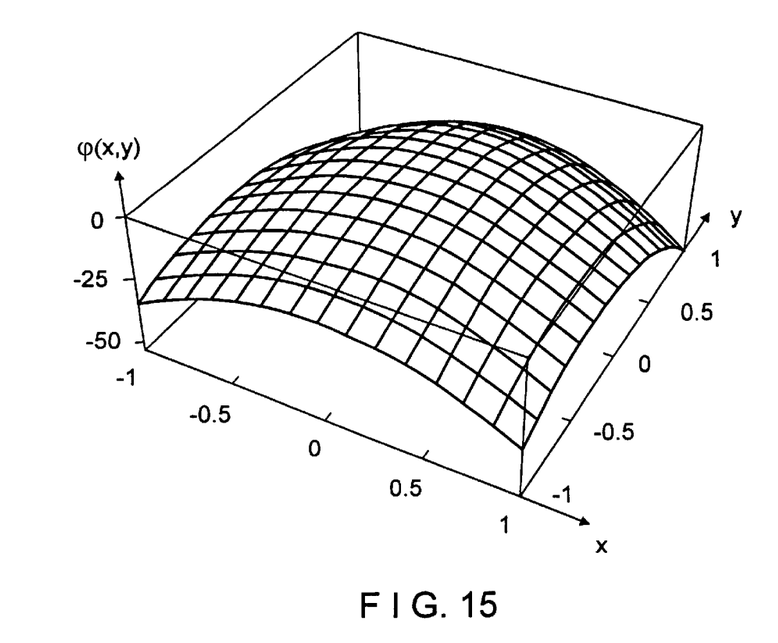
FIG. 15 is a perspective view illustrating, three-dimensionally, a pattern formed on the hologram diffractive surface in the optical pickup of the present invention.
Figure 16:
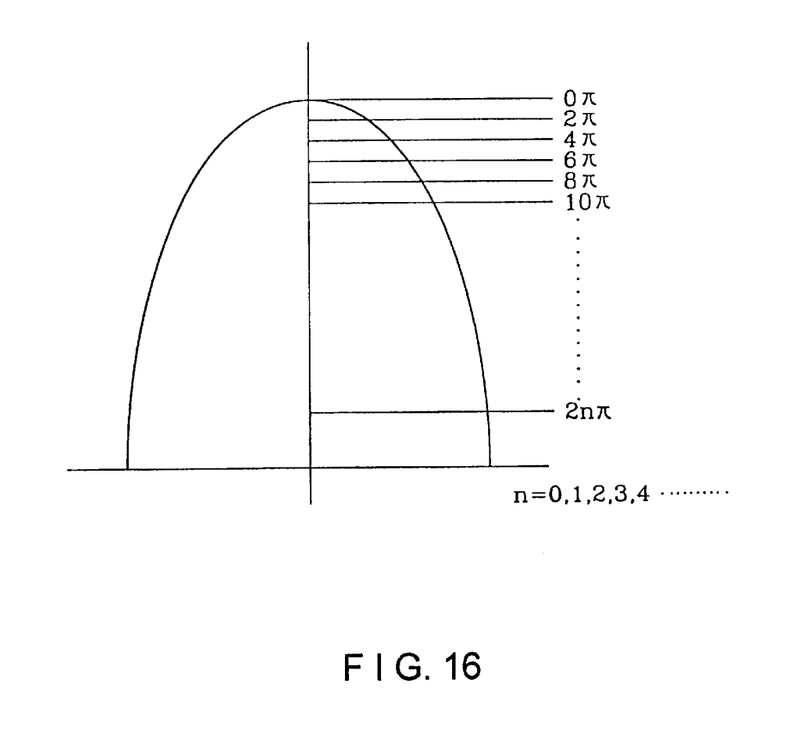
FIG. 16 is a graph illustrating, two-dimensionally, the pattern formed on the hologram diffractive surface in the optical pickup of the present invention.

Accordingly, when three-dimensionally depicting a pattern of the hologram diffractive surface 13 realized through the equations 4 and 5, a surface having a contour line-shaped configuration as shown in FIG. 15 is obtained. When two-dimensionally depicting the pattern of the hologram diffractive surface 13, a predetermined curve as shown in a graph of FIG. 16 can be obtained.

Figure 14:
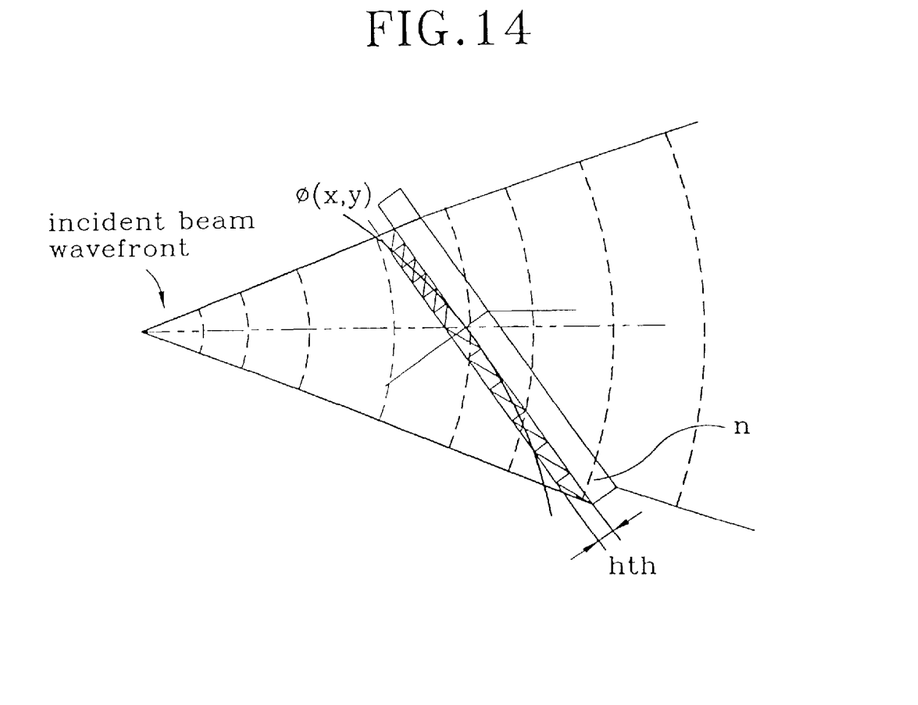
FIG. 14 is a conceptual view illustrating a beam which passes through the holographic beam splitter having the hologram diffractive surface sloped at a predetermined angle.

Further, by sequentially cutting the curve shown in the graph of FIG. 14 by a level value of $2\pi$ from an apex thereof and projecting cut portions on a plane (x,y), a pattern of the hologram diffractive surface 13 as shown in FIG. 12, which has the rectangular and ellipsoidal configuration can be obtained.

In the meanwhile, the hologram diffractive surface 13 of the holographic beam splitter 12 can be represented through predetermined data value, an example of which is described below:

First, as shown in FIG. 9, by calculating through a computer distances between optical systems, data of the holographic beam splitter 12 on which the hologram diffractive surface 13 is formed, and data of the collimator lens 16, wave form coefficients were obtained as given in a table 1.

At this time, the data of the holographic beam splitter 12 were as described below:

a thickness (t)=2.0 mm, an index of refraction (n)=1.46, and a mounting angle (θ)=45°.

Also, the data of the collimator lens 16 were as described below:

both spherical surface values (r)
=132.96000 mm,
=−13.3 mm,
a constant value K=−0.717720,
constants A=0.000000E+00, B=0.000000E+00, C=0.000000E+00, D=0.000000E+00,
a thickness (t)=1.7 mm
a refraction index of lens element=
1.525500 (780 nm),
1.529500 (650 nm),
1.530000 (630 nm).

TABLE 1

(X Term) →

| | | | n | | | | |
|---|---|---|---|---|---|---|---|
| m | 0 | 1 | 2 | 3 | 4 | 5 | 6 |
| 0 | | C1 | C3 | C6 | C10 | C15 | C21 |
| 1 | C2 | C4 | C7 | C11 | C16 | C22 | |
| 2 | C5 | C8 | C12 | C17 | C23 | | |
| 3 | C9 | C13 | C18 | C24 | | | |
| 4 | C14 | C19 | C25 | | | | |
| 5 | C20 | C26 | | | | | |
| 6 | C27 | | | | | | |

↑
(Y Term)

C1: 4.3436E-06  C2: 4.4429E-05  C3: −1.1146E-02
C4: 7.1737E-07  C5: −7.9783E-03  C6: −8.2952E-08
C7: −2.3822E-03  C8: −4.2520E-08  C9: −1.7300E-03
C10: −9.7230E-05  C11: −3.4259E-06  C12: −2.7213E-04
C13: −6.2072E-07  C14: −2.6421E-04  C15: −3.5090E-07
C16: 1.2160E-04  C17: 6.1894E-06  C18: −9.6435E-05
C19: 1.4515E-05  C20: −3.3476E-05  C21: 7.3348E-04
C22: 1.0975E-05  C23: −9.7737E-05  C24: 1.1944E-05
C25 : −2.8690E-04  C26 : 6.4594E-07  C27 : 1.9567E-05

By substituting values given in the table 1 into the equation 5, a light wave value can be expressed as given in the following equation 6:

$$\text{Equation 6:} \quad \phi = \frac{2\pi}{\lambda}(C_1 x y^0 + C_2 x^0 y^1 + C_3 x^2 y^0 \cdots C_{27} x^0 y^6)$$

Due to the fact that the optical pickup includes the holographic beam splitter 12 having the essential feature of the present invention, when the optical pickup is operated by using the first light source 10, a light emitted from the first light source 10 is emitted onto the flat beam splitter 15 through the hologram beam splitter 12.

At this time, the holographic diffractive surface 13 compensates the astigmatism and the coma generated when the beam is passed through the flat glass, by the characteristics described above.

When the optical pickup is operated by using the second light source 11, a light emitted from the second light source 11 is reflected from the coating layer 14 of the hologram beam splitter 12, emitted and reflected onto and from the flat beam splitter 15, and then spotted onto the optical disc 18 after passing through the collimator lens 16 and the objective lens 17.

The beam reflected from the optical disc 18 is spotted onto the photodiode 19, and the error signal is detected from the beam spotted onto the photodiode 19.

Figure 17:
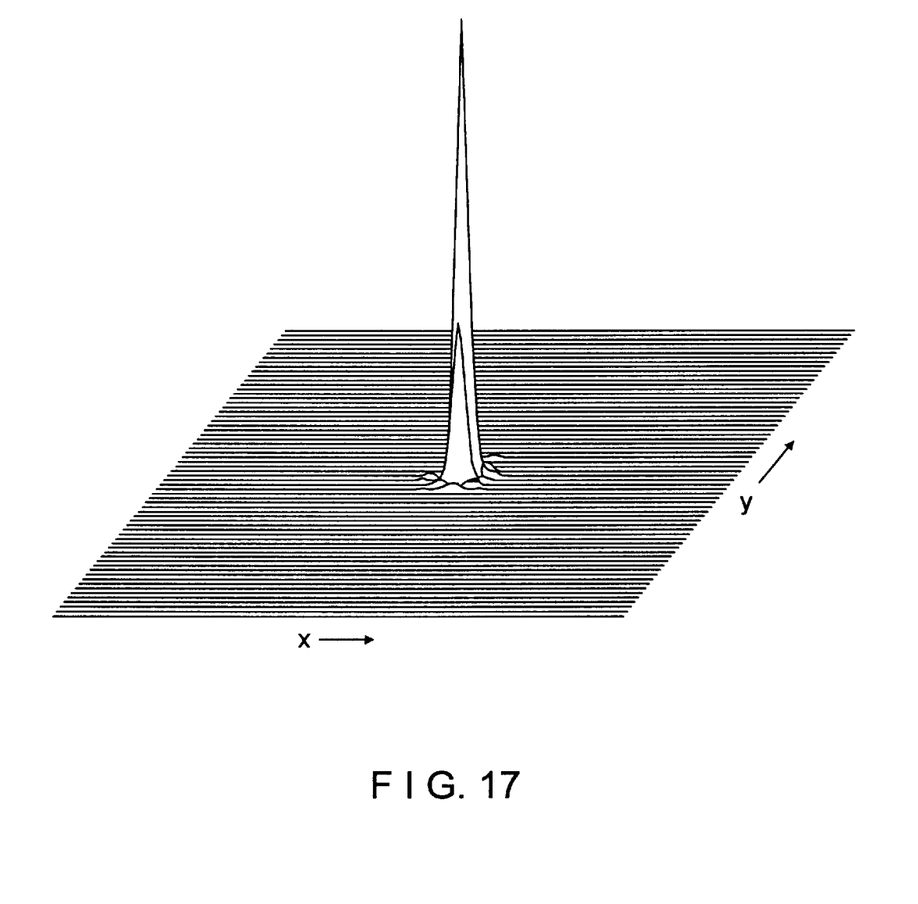
FIG. 17 is a spot diagram of the beam generated through the optical pickup of the present invention.
Figure 18:
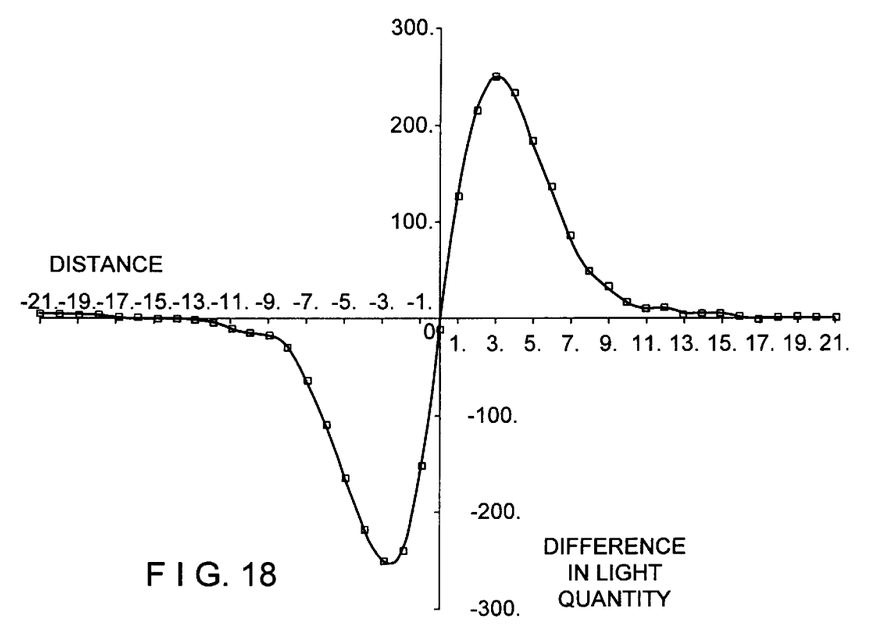
FIGS. 18 through 21 are graphs each illustrating an S-curve formed according to a distribution of quantity of light generated through the optical pickup of the present invention.
Figure 19:
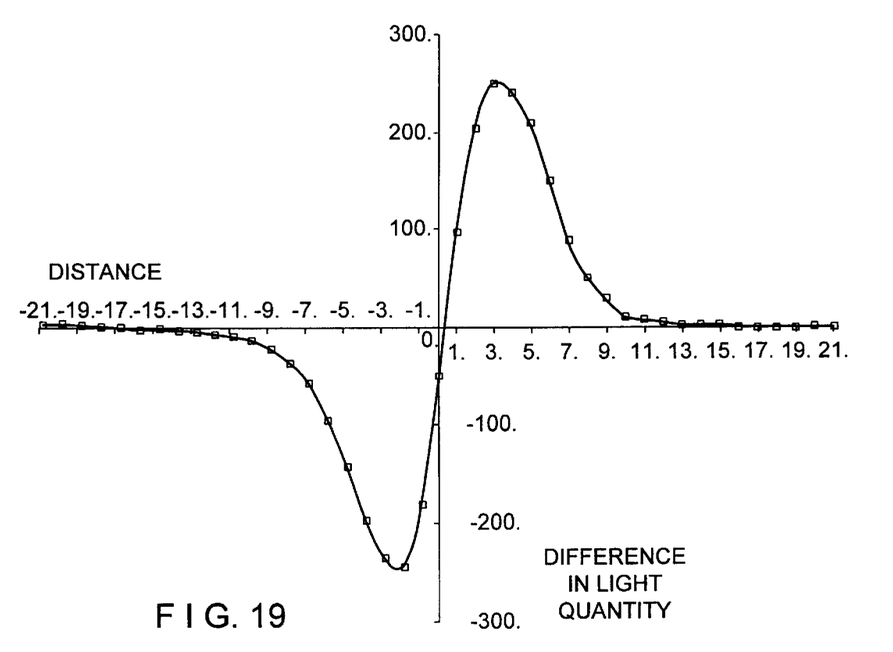
Figure 20:
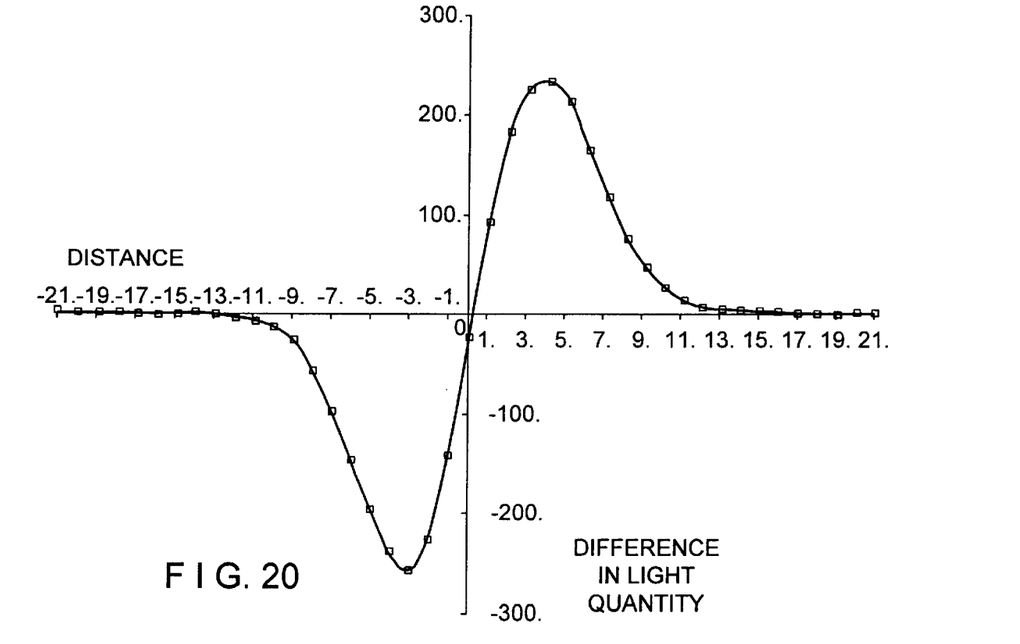
Figure 21:
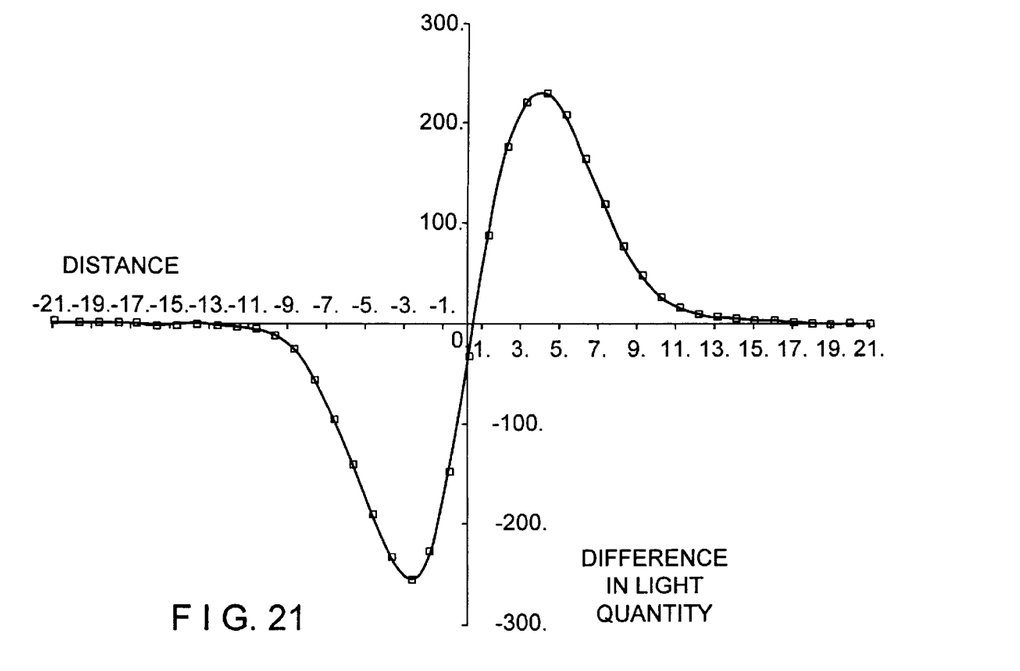

On the other hand, referring to FIG. 17, there is shown a spot diagram of the laser beams which are passed through the optical system constructed as mentioned above.

As shown in FIG. 17, a spotted state of the beams obtained by the present invention is the same as that of FIG. 2.

In other words, the astigmatism is hardly generated through the holographic beam splitter 12 and this feature makes the wavefront error of the optical system is maintained within a value of 0.001. Accordingly, it is possible to obtain the same effect as that obtained by using an expensive cubic beam splitter.

Namely, a permissible total wavefront error of <0.04λ (λ=0.65 μm) for the digital video disc and a permissible total wavefront error of <0.07λ (λ=0.78 μm) for the compact disc can be satisfied.

And the optical axis tilt due to the wavelength variation is hardly generated, when observing the light detected through the photodiode 19, S-curves as shown in FIGS. 18 through 21 can be obtained.

Referring to FIGS. 18 through 21, in case that a wavelength of a beam emitted from the laser diode is varied, the same S-curve is obtained.

As shown in FIGS. 4 and 5, a difference in light quantity focused onto a four-divided photodiode is easily calculated, through which a stable objective lens can be achieved to perform a stable focusing operation. That is, a focusing error is not generated.

As described above, according to the present invention, a problem of the prior art that since the two-light sources optical pickup hologram is anisometrically used to divide two lights, optical capability is decreased due to a tilt of an optical axis in accordance with wavelength variation of a laser diode, is resolved by using a hologram beam splitter which is disposed to let the hologram diffractive face sloped at a predetermined angle, and isometrically divides lights emitted from two light sources.

Also, while in the prior art, when two flat beam splitters are used in the optical system, since it is difficult to properly define axial angles between the two flat beam splitters and two light sources, a construction of the optical system is much involved and properties such as aberration, etc. are deteriorated, in the present invention, by using a hologram diffractive surface, axial angles between the two light sources and the hologram are defined as 90° and 45°, whereby a construction of an optical system is simplified. Besides, stable recording and reproducing operations are ensured due to the fact that an astigmatism generated upon use of the flat beam splitter is compensated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An optical pickup comprising:
   a first light source for emitting a laser beam having a first predetermined wavelength;
   a second light source disposed on an optical axis such that it is substantially perpendicular to the first light source, for emitting a laser beam having a second predetermined wavelength which is different from the first predetermined wavelength;
   a holographic beam splitter disposed at a point where the laser beams emitted from the first and second light sources are crossed with each other, the holographic beam splitter having one surface on which a hologram diffractive surface is formed and the other surface on which a coating layer for being penetrated by and reflecting the laser beams at a first predetermined ratio is formed in a manner such that the holographic beam splitter compensates an aberration with respect to one beam of the beams emitted from the first and second light sources which one be am is incident on the hologram diffractive surface and then allows the one beam to penetrate, and that the holographic beam splitter reflects the other beam of the beams emitted from the first and second light sources which the other beam is incident on the coating layer;

a flat beam splitter arranged on a first path of the laser beams of the first and second light sources which are passed through the holographic beam splitter, for being penetrated by and reflecting the laser beams at a second predetermined ratio;

a collimator lens arranged on a second path of the laser beams of the first and second light sources which are passed through the flat beam splitter, for shaping the laser beams emitted from the first and second light sources;

an objective lens for focusing the laser beams shaped by the collimator lens upon an optical disc; and a photodiode arranged below the flat beam splitter, for reading out recorded information and an error from the laser beams which are focused and reflected upon and from the optical disc.

2. The optical pickup as claimed in claim 1, wherein the hologram diffractive surface has a shape consisting of uniformly spaced anisometric prolate ovals formed around a central portion of the hologram diffractive surface while satisfying the following expression:

$$\phi = \frac{2\pi}{\lambda}(C_1 xy^0 + C_2 x^0 y^1 + C_3 x^2 y^0 \cdots C_{27} x^0 y^6).$$

3. The optical pickup as claimed in claim 1, wherein the optical disc is a digital video disc, and the first light source is a laser diode which emits a laser beam of 650 nm wavelength.

4. The optical pickup as claimed in claim 1, wherein the optical disc is a compact disc, and the second light source is a laser diode which emits a laser beam of 780 nm wavelength.

5. The optical pickup as claimed in claim 1, wherein the optical disc is a compact disc, and the first light source is a laser diode which emits a laser beam of 780 nm wavelength.

6. The optical pickup as claimed in claim 1, wherein the optical disc is a digital video disc, and the second light source is a laser diode which emits a laser beam of 650 nm wavelength.

* * * * *